（12）United States Patent
Kokrehel et al.

(10) Patent No.: US 11,953,067 B2
(45) Date of Patent: Apr. 9, 2024

(54) BRAKE ASSEMBLY AND METHOD FOR CONTROLLING A BRAKE ASSEMBLY

(71) Applicant: KNORR-BREMSE Systeme fuer Nutzfahrzeuge GmbH, Munich (DE)

(72) Inventors: Csaba Kokrehel, Budapest (HU); Huba Nemeth, Budapest (HU); Andreas Buch, Taufkirchen (DE); Andras Sipos, Munich (DE); Viktor Tihanyi, Budapest (HU); Janos Szabo, Budapest (HU); Csaba Mlinarcsek, Budapest (HU); Wolfgang Pahle, Bad Wiessee (DE); Robert Trimpe, Wessling (DE); Michael Blessing, Munich (DE); Matthias Klingner, Moorenweis (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 470 days.

(21) Appl. No.: 17/276,902

(22) PCT Filed: Aug. 28, 2019

(86) PCT No.: PCT/EP2019/073020
§ 371 (c)(1),
(2) Date: Mar. 17, 2021

(87) PCT Pub. No.: WO2020/057928
PCT Pub. Date: Mar. 26, 2020

(65) Prior Publication Data
US 2021/0356008 A1 Nov. 18, 2021

(30) Foreign Application Priority Data
Sep. 18, 2018 (EP) .................................... 18195255

(51) Int. Cl.
*F16D 65/18* (2006.01)
*F16D 59/02* (2006.01)
(Continued)

(52) U.S. Cl.
CPC ............. *F16D 65/18* (2013.01); *F16D 59/02* (2013.01); *F16D 63/006* (2013.01);
(Continued)

(58) Field of Classification Search
CPC ........ F16D 65/18; F16D 59/02; F16D 63/006; F16D 2055/0091; F16D 2121/06;
(Continued)

(56) References Cited

U.S. PATENT DOCUMENTS 6,257,377 B1 * 7/2001 Schumann .............. F16D 65/00
188/161
6,412,608 B1 * 7/2002 Mohr ...................... F16D 65/18
188/72.8
(Continued)

FOREIGN PATENT DOCUMENTS

CN 1682039 A 10/2005
CN 101468643 A 7/2009
(Continued)

OTHER PUBLICATIONS

Japanese-language Office Action issued in Japanese Application No. 2021-538901 dated Apr. 12, 2022 with English translation (17 pages).
(Continued)

*Primary Examiner* — Thomas W Irvin
(74) *Attorney, Agent, or Firm* — Crowell & Moring LLP

(57) ABSTRACT

A brake assembly includes a brake disc in rotational engagement with a wheel of a vehicle, a brake pad which frictionally engages the brake disc in a dynamic braking operation and a parking brake operation, a dynamic actuator adapted
(Continued)

to bring the brake pad and brake disc into the frictional engagement in the dynamic braking operation, and a parking brake actuator associated with the dynamic actuator such that, in the parking brake operation, the frictional engagement of the brake disc and brake pad is maintained.

15 Claims, 2 Drawing Sheets

(51) Int. Cl.
*F16D 63/00* (2006.01)
*F16D 55/00* (2006.01)
*F16D 121/06* (2012.01)
*F16D 121/22* (2012.01)
*F16D 125/64* (2012.01)
*F16D 127/06* (2012.01)
*F16D 129/06* (2012.01)

(52) U.S. Cl.
CPC .. *F16D 2055/0091* (2013.01); *F16D 2121/06* (2013.01); *F16D 2121/22* (2013.01); *F16D 2125/64* (2013.01); *F16D 2127/06* (2013.01); *F16D 2129/065* (2013.01)

(58) Field of Classification Search
CPC ............. F16D 2121/22; F16D 2125/64; F16D 2127/06; F16D 2129/065
See application file for complete search history.

(56) References Cited

U.S. PATENT DOCUMENTS

| | | | |
|---|---|---|---|
| 6,471,017 | B1 | 10/2002 | Booz et al. |
| 9,702,421 | B2 * | 7/2017 | Iwata ................. F16H 63/3475 |
| 9,855,934 | B2 * | 1/2018 | Yasui .................... B60T 13/741 |
| 10,408,289 | B2 * | 9/2019 | Chelaidite ............. B60T 13/741 |
| 10,502,277 | B2 * | 12/2019 | Masuda ................ B60T 13/741 |
| 2005/0258682 | A1 | 11/2005 | Halasy-Wimmer et al. |
| 2006/0032712 | A1 * | 2/2006 | Kollaard ................. F16D 28/00 188/72.8 |
| 2008/0314701 | A1 | 12/2008 | Bogelein et al. |
| 2009/0045018 | A1 | 2/2009 | Baumgartner et al. |
| 2010/0051395 | A1 | 3/2010 | Sano et al. |
| 2016/0084330 | A1 * | 3/2016 | Gibbens .................. F16D 65/38 701/70 |
| 2016/0123412 | A1 * | 5/2016 | Iwata .................. F16H 63/3483 188/265 |
| 2016/0244035 | A1 * | 8/2016 | Yasui ...................... B60T 7/122 |
| 2017/0108067 | A1 | 4/2017 | Masuda et al. |
| 2018/0073585 | A1 * | 3/2018 | Masuda ................ F16D 55/226 |
| 2023/0132084 | A1 * | 4/2023 | Kim ........................ F16D 65/18 188/72.3 |
| 2023/0166705 | A1 * | 6/2023 | Blessing ................ B60T 1/005 188/162 |
| 2023/0182708 | A1 * | 6/2023 | Kokrehel ................ F16D 65/18 188/72.9 |
| 2023/0256952 | A1 * | 8/2023 | Kokrehel .................. B60T 8/92 188/106 P |

FOREIGN PATENT DOCUMENTS

| | | |
|---|---|---|
| CN | 101660580 A | 3/2010 |
| CN | 202056226 U | 11/2011 |
| CN | 206668807 U | 11/2017 |
| CN | 207145487 U | 3/2018 |
| CN | 207145489 U | 3/2018 |
| CN | 108105295 A | 6/2018 |
| EP | 3 299 660 A1 | 3/2018 |
| GB | 2 156 020 A | 10/1985 |
| JP | 2016-217415 A | 12/2016 |
| WO | WO 2007/082658 A1 | 7/2007 |

OTHER PUBLICATIONS

International Search Report (PCT/ISA/210) issued in PCT Application No. PCT/EP2019/073020 dated Oct. 30, 2019 (two (2) pages).

Written Opinion (PCT/ISA/237) issued in PCT Application No. PCT/EP2019/073020 dated Oct. 30, 2019 (seven (7) pages).

Extended European Search Report issued in European Application No. 18195255.7 dated Apr. 1, 2019 (eight (8) pages).

Chinese-language Office Action issued in Chinese Application No. 201980061057.3 dated Oct. 26, 2022 with English translation (16 pages).

Korean-language Office Action issued in Korean Application No. 10-2021-7009074 dated Sep. 26, 2022 with English translation (10 pages).

Chinese-language Office Action issued in Chinese Application No. 201980061057.3 dated Mar. 31, 2022 with English translation (16 pages).

\* cited by examiner

BRAKE ASSEMBLY AND METHOD FOR CONTROLLING A BRAKE ASSEMBLY

BACKGROUND AND SUMMARY OF THE INVENTION

The present invention relates to a brake assembly. Further, the invention provides a method for controlling a brake assembly, in particular for performing a parking brake operation via a brake assembly.

A common brake assembly normally provides two functions, namely the dynamic or service braking function for decelerating vehicles and the parking brake function for keeping the vehicle stationary and in many cases also for performing an emergency stop. Usually, a separate actuator is provided to realize the respective dynamic braking and parking brake function. The dynamic braking actuator and the parking brake actuator are actuated independently from one another.

WO 2007/082658 A1 teaches a self-energizing disc brake with an electro-mechanic actuator for the dynamic braking operation. A planetary gearing actuated by the actuator applies a braking force onto the brake pad and brake disc in a dynamic braking operation. In a parking brake operation, the planetary gearing drives two parallel threaded spindles via a gear-wheel such that a rotational movement of the gear-wheel is transformed into a translational movement of the threaded spindles in order to press the brake pad onto the brake disc. However, such a brake assembly it is disadvantageous with regard to high costs and complexity of the structure.

It is an object of the present invention to overcome the disadvantages of the prior art, particularly to provide an optimized brake assembly which is cost-efficient and easy to manufacture.

The object is solved by the subject matter of the independent claims.

According to an aspect of the present invention, a brake assembly comprises a brake disc in rotational engagement with a wheel of a vehicle. Therefore, the brake disc performs a rotational movement in accordance with the rotation of the wheel of the vehicle during driving the car. Further, a brake pad frictionally engages the brake disc when an actuator force is applied thereto, preferably in order to perform a dynamic braking operation or a service braking operation. The brake assembly also comprises an actuator having an output shaft driven in a forward direction to bring the brake pad and the brake disc into frictional engagement which defines the braking position of the brake assembly. The actuator may for example comprise an electromotor and a transmission member which are coupled to the output shaft such that a rotational movement of the electromotor, preferably of a rotor of the electromotor, is converted into an axial translational movement of the output shaft by means of the transmission member. The output shaft may also be driven in a reverse direction, opposite to the forward direction, to disengage the brake pad and brake disc and to move the brake pad into a rest position. The rest position may be defined as the position in which no actuator force respectively braking force is applied and/or as the position to which the brake pad moves after a braking operation, preferably a dynamic braking operation. The moving direction of the brake pad is not necessarily coaxially arranged with regard to a moving direction of the output shaft, however, a forward movement of the output shaft leads to a forward movement of the brake pad preferably into the frictional engagement with the brake disc, and a reverse movement of the output shaft leads to a reverse movement of the brake disc preferably to disengage the frictional contact with the brake disc.

The brake assembly according to the invention also comprises a parking brake actuator which is associated with the dynamic actuator such that in the parking brake operation the frictional engagement of the brake disc and brake pad is maintained. Thereby, the braking force supplied to the wheel of the vehicle is maintained. It is an advantage of the present invention, that a cost efficient and easy to manufacture brake assembly is provided. No additional force transmission components are needed in order to realize the parking brake operation because of the concept according to the invention of using the dynamic actuator to maintain the frictional engagement between the brake disc and brake pad.

In an example embodiment of the present invention the dynamic actuator comprises an output shaft driven in a forward direction to bring the brake pad and brake disc in the frictional engagement. The output shaft may also be driven in a reverse direction to disengage the brake pad and brake disc. Conclusively, the dynamic actuator causes and/or controls the actuation of the brake assembly in that, in order to apply a braking force, the output shaft is driven in the forward direction, and in order to release the braking force during the driving of the vehicle, the dynamic actuator drives the output shaft in the reverse direction. The dynamic actuator may define a force transmission direction for driving the output shaft. The force transmission direction does not necessarily have to be the same, preferably parallel and/or coaxial, to the forward and reverse direction. The force transmission direction may be defined as the direction of the actuated force generated by the dynamic actuator in order to drive the output shaft in the forward and reverse direction. For example, the dynamic actuator may comprise a transmission unit which may convert a rotational and/or translational movement of a driving member of the dynamic actuator into the translational movement of the output shaft, wherein the force transmission direction is defined by the tranmission unit, preferably the driving member. According to a further development, the parking brake actuator is coaxially arranged with regard to the dynamic actuator, preferably with regard to the force transmission direction of the dynamic actuator. In particular, an actuating force direction of the parking brake actuator is coaxially arranged with regard to the force transmission direction. This means that the actuating force direction of the parking brake configured to maintain the frictional engagement of the brake disc and brake pad in the parking brake operation which is applied to the dynamic actuator is coaxial with regard to the force transmission direction. Therefore, a linear force flux between the parking brake actuator and the dynamic actuator is achieved. Further, no additional transmission means for redirecting the direction of the force flux between the dynamic actuator and the parking brake actuator is needed.

In a further example embodiment of the present invention, the force transmitting engagement between the dynamic actuator and the parking brake actuator in the parking brake operation is realized via a form-fit and/or a force-fit. Preferably, no separate attachment means, such as srewing or the like, are provided. In other words, the force transmitting engagement between the dynamic actuator and the parking brake actuator functions according to the principle of a mechanical coupling for releaseably attaching of two movable components in order to transmit forces between the movable components, such as the dynamic actuator and the parking brake actuator. In a further development of the present invention, the force transmitting engagement between the dynamic actuator and the parking brake actuator is realized by the force transmission member associated with the dynamic actuator and the parking brake actuator such that a form-fit and/or a force-fit is involved.

In an example embodiment of the present invention, the parking brake actuator comprises a coupling member which form-fittingly and/or force-fittingly engages the dynamic actuator. Preferably, the coupling member is continuously coupled to the dynamic actuator. Further, the coupling member may be preferably fixedly attached to a component of the dynamic actuator generating or transmitting the actuator force such that the coupling member is moved in accordance with the respective component of the dynamic actuator. In order to realize the force transmitting engagement between the dynamic actuator and the parking brake actuator the force transmission member is configured to form-fittingly and/or force-fittingly engage the coupling member. In the engaged state of the force transmission member and the coupling member the coupling member is prevented from further moving, preferably rotating or translationally moving, thereby preventing further movement of the output shaft such that the position of the brake pad with respect to the brake disc is secured or fixed. Thus, for example, the parking brake position and the rest position may be maintained.

In a further development of the present invention the coupling member is coupled to the output shaft such that upon engagement of the force transmission member force flux from the output shaft to the force transmission member is redirected from the forward and reverse direction into a radial direction perpendicular with regard to the forward and reverse direction. The coupling member may be coupled to the output shaft in the sense of a mechanical key element according to which relative rotational movement and relative axial movement are prevented such that, when the actuator drives the output shaft in the forward or reverse direction, the coupling member is axially displaced in the respective forward or reverse direction in accordance with the output shaft. Preferably, the force transmission member is arranged and/or designed such that in the force transmitting engagement between the coupling member and the force transmission member, axial movement in the forward and reverse direction of the output shaft respectively the coupling member is prevented.

In another example embodiment of the present invention, the coupling member is coupled to a rotating drive member or rotating drive output of the dynamic actuator which generates the forward and reverse driving force of the output shaft such that upon engagement of the force transmission member force flux from the rotating drive member to the force transmission member is redirected from a rotational direction of the rotating drive member into the forward and reverse direction. In the force transmitting engagement rotational movement of the rotating drive member is prevented and rotational forces acting on the rotational drive member are redirected into the force transmission member in the forward respectively reverse direction.

In a further example embodiment of the present invention, the engagement between the coupling member and the force transmission member is realized by an interlocking structure, preferably a protrusion-recess-structure. Alternatively, the engagement between the coupling member and the force transmission member may be realized only by frictional contact, preferably in the manner of a friction coupling. In a further development of the brake assembly, the coupling member and the force transmission member each comprise at least one protrusion and/or at least one recess, the at least one recess and/or protrusion of the coupling member and the force transmission member may be adapted in shape with regard to each other in order to realize the form-fitting and/or force-fitting engagement. Furthermore, the at least one recess and/or at least one protrusion of the coupling member and the force transmission member may be adapted such that force flux between the coupling member and the force transmission member is assured in the engagement state.

In another example embodiment of the present invention, the parking brake actuator is bistable. This means that the parking brake actuator comprises two stable operation states in which the parking brake actuator may rest without further energy supply. The parking brake actuator may stay in an active parking brake position and a passive rest position without energy supply. In the parking brake operation, after the parking brake actuator causes the force transmitting engagement between the dynamic actuator and the parking brake actuator, the active parking brake position is maintained without the necessity of further energy supply respectively actuation forces generated by either the dynamic actuator or the parking brake actuator. Further, after releasing the force transmitting engagement between the dynamic actuator and the parking brake actuator, the frictional engagement between the brake disc and brake pad is released and the parking brake actuator reaches its second stable position, namely the passive rest position, in which no additional energy supply respectively actuator forces generated by the dynamic actuator or the parking brake actuator is needed to maintain the parking brake actuator in the passive rest position. Therefore, a cost-efficient and reliable brake assembly is provided.

According to a further development of the present invention, a spring member is adapted to maintain the parking brake actuator in one of the active or passive position. Further, a magnet unit, preferably a permanent magnet unit, may be adapted to maintain the parking brake actuator in the other of the active or passive position. The spring member and the magnet unit may be arranged such that after the parking brake actuator has taken or adopted either the active or passive position, the spring member or the magnet unit applies a spring force respectively a magnetic force on the parking brake actuator in order to maintain the respective active or passive position. Therefore, no further energy supply is needed to keep the parking brake actuator either in the active parking brake position or the passive rest position. Further, the spring member and the magnet unit may be arranged such that the spring force adapted to maintain the parking brake actuator in one of the active or passive position and the magnetic force adapted to maintain the parking brake actuator in the other of the active or passive position comprise a different orientation, preferably are directed in opposite directions.

In a further development of the present invention, the force transmission member is pushed by the spring member into the force transmitting engagement with the coupling member, respectively the active position of the parking brake actuator. The spring member may be arranged and/or designed such that a deformation restoring force is generated by the spring member if the parking brake actuator leaves the active parking brake position. It is clear that an actuator force generated by the parking brake actuator in order to disengage the force transmitting engagement between the dynamic actuator and the parking brake actuator must be higher than the deformation restoring force generated by the spring member. Further, the force transmission member may be pulled by the magnet unit into the passive position and preferably maintained in the passive position by the magnetic force generated by the magnet unit and applied on the force transmission member, which is preferably magnetic or comprises a magnetic component, preferably a magnetic coating. In the active position, the spring force generated by the spring member is higher than the magnetic force generated by the magnet unit. In the passive position, the magnetic force generated by the magnet unit is higher that the spring force generated by the spring member. Therefore, the bistability of the parking brake actuator is assured. Alternatively, the spring member respectively the magnet unit maybe associated with the other of the two stable positions, namely the magnet unit may be associated with the active parking brake position and the spring member may be associated with the passive rest position.

In an example embodiment of the present invention, the parking brake actuator comprises an electromagnet for actuating the parking brake actuator. Alternatively, the electromagnet may be a separate component. In other words, the generation of the actuating force by the parking brake actuator in order to realize the frictional engagement between the parking brake actuator and the dynamic actuator, preferably between the force transmission member and the coupling member, is controlled by an electromagnet associated with the parking brake actuator. According to a further development, the direction and/or amount of movement of the force transmission member is controlled by the magnetic field which is produced by an electric current preferably through a coil of the electromagnet. This means that in order to move the force transmission member into the frictional engagement with the coupling member or to disengage the force transmission member form the coupling member the electromagnet is activated such that an electric current through the coil is produced. By changing the amount and/or direction of the magnetic field, preferably the electric current, the force transmission member may be either brought into the frictional engagement or disengaged from the frictional engagement. After the electromagnet has activated the brake actuator to move the force transmission member either into engagement or out of the engagement, the electromagnet may be deactivated and the bistable parking brake actuator mains its current active braking parking brake position or passive rest position without further energy supply. This means that if the parking brake actuator has reached one of the two stable positions, no further electric current through the coil is needed.

In a further development of the present invention, the dynamic actuator is a pneumatic actuator, an electro-mechanic actuator or a hydraulic actuator. The concept of the present invention is therefore not limited to a specific type of actuation of the brake assembly.

According to another aspect of the present invention, a method for controlling a brake assembly is provided.

The brake assembly comprises a brake disc, a brake pad, an actuator with an output shaft driven in a forward direction to bring the brake pad and brake disc into frictional engagement. The position of the brake pad and brake disc in the frictional engagement is referred to as the braking position. The output shaft may be driven in a reverse direction to disengage the brake pad and brake disc and to move the brake pad into a rest position. The rest position is referred to as the position in which no actuator force respectively no braking force is applied and which may also be referred to as an idle position to which the brake pad returns after a braking operation, in particular during dynamic or service braking operations.

According to the invention, in the parking brake operation the brake pad is brought into frictional engagement with the brake disc by the dynamic actuator. This means that a braking force is applied for preventing further rotation of the wheel of the vehicle. Then, the frictional engagement of the brake disc and brake pad is maintained preferably by a parking brake actuator associated with the dynamic actuator.

Preferred embodiments are given by the dependent claims.

It is noted that the method according to the invention can be find such that it realizes a brake assembly according to the described aspects of the invention, and vice versa.

The following detailed description refers to the accompanying drawings. The same reference numbers may be used in different drawings to identify the same or similar elements. In the following description, for purposes of explanation and not limitation, specific details are set forth such as particular structures, functionality etc. in order to provide a thorough understanding of the various aspects of the claimed invention.

It will be apparent to those skilled in the art having the benefit of the present disclosure that the various aspects of the invention claimed may be practiced in other examples that depart from these specific details. In certain instances, descriptions of well-known devices and methods are omitted so as not to obscure the description of the present invention with unnecessary detail.

DETAILED DESCRIPTION OF THE DRAWINGS

Figure 1:
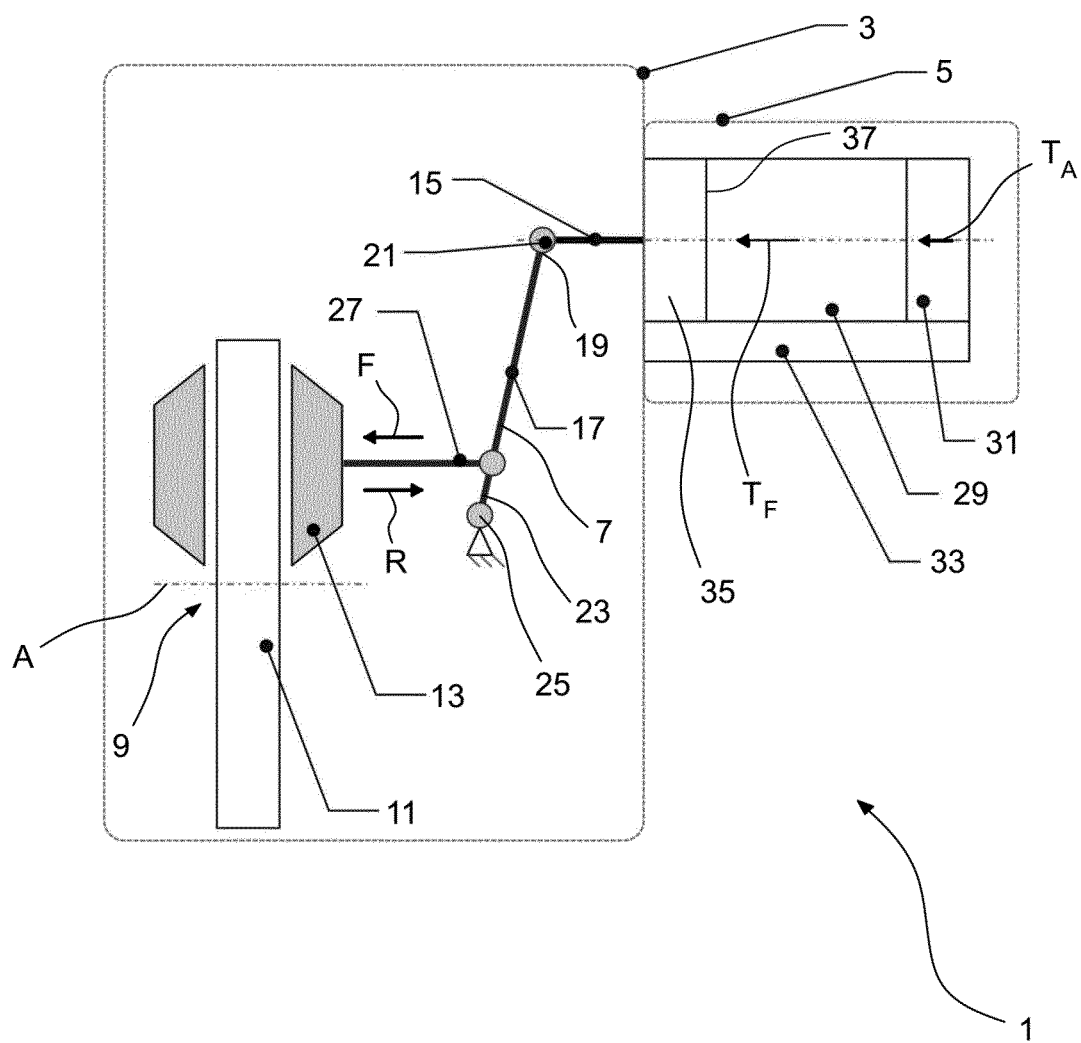
FIG. 1 is a schematic view of a brake assembly according to an embodiment of the invention.

In the following description of preferred embodiments a brake assembly is generally indicated by the reference numeral 1.

Figure 2:
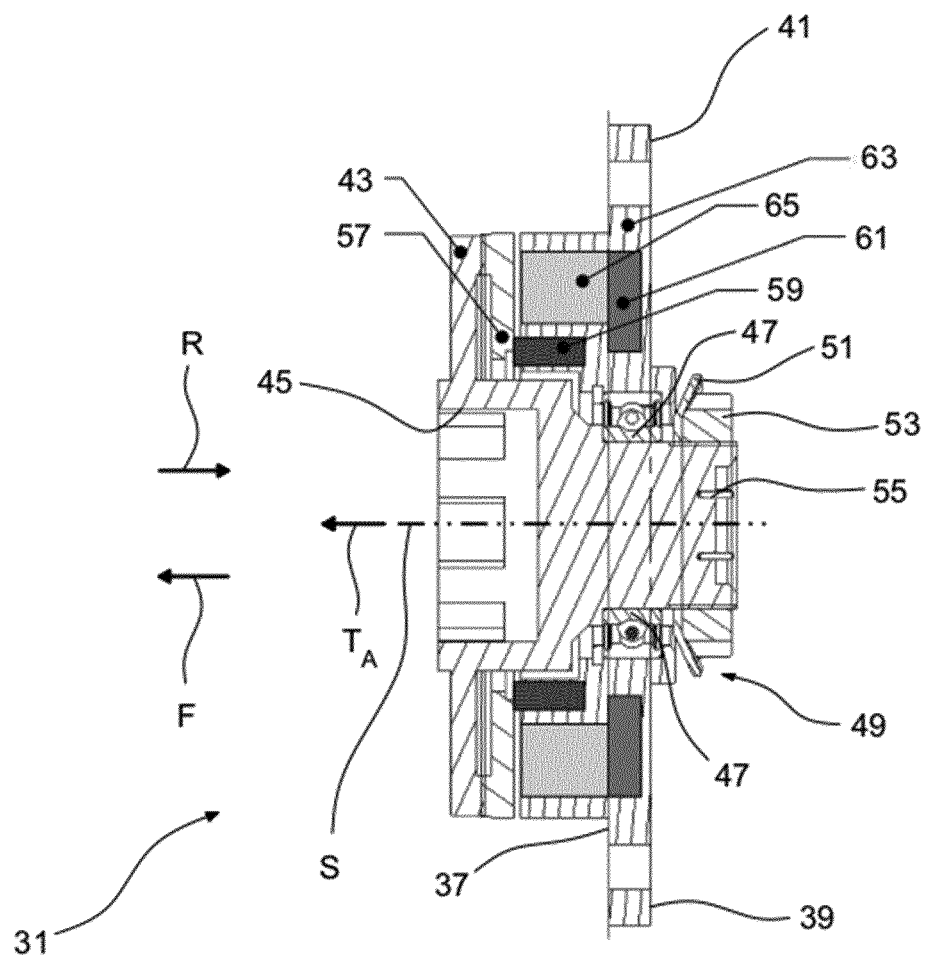
FIG. 2 is a cross-sectional view of a parking brake actuator of the brake assembly according to FIG. 1.

The functioning and the general structure of the brake assembly 1 is illustrated in FIG. 1, whereas in FIG. 2 an example embodiment of a parking brake actuator of the brake assembly 1 is shown in more detail.

Referring to FIG. 1, the brake assembly 1 generally comprises two main components, namely a caliper unit 3 and an actuator unit 5, wherein the caliper unit 3 is adapted to apply a braking force onto a wheel (not shown) of a vehicle (not shown) and the actuator unit 5 is adapted to activate and, respectively, deactivate the caliper unit 3.

The caliper unit 3 comprises a lever arrangement 7 force-transmittingly connected to the actuator unit 5 and a braking unit 9 directly applying the braking force to the wheel of the vehicle. The braking unit 9 has a brake disc 11 which is in rotational engagement with the wheel of the vehicle and against which the brake pads 13 are clamped in order to provide the braking force. During driving of the car, the brake disc 11 rotates around its rotational axes, which is indicated in FIG. 1 by the reference sign A. In case of a braking operation the brake pad 13 is moved into frictional engagement with the brake disc 11 in order to slow down or prevent the rotation of the brake disc 11 respectively the wheel around the axis of rotation A.

The braking force is generally generated by the actuator unit 5 which drives an output shaft 15 in a forward direction F to bring the brake pad 13 and brake disc 11 into the frictional engagement, and a reverse direction R to disengage the brake pad 13 and brake disc 11. The lever arrangement 7 is connected to the output shaft 15 and to the brake pad 13 such that the forward and reverse movement of the output shaft 15 is transformed into a forward and reverse movement of the brake pad. The lever arrangement 7 comprises a pivoting lever 17 fixedly connected to the output shaft 15 at a first end 19 by means of a coupling element 21. At its other end 23, the pivoting lever 17 is fixedly connected to a rotational bearing 25 fixedly coupled to a chassis (not shown) of the vehicle. Therefore, the rotational bearing 25 is stationary.

In FIG. 1, the brake assembly 1 is shown in a passive, non-braking operation situation where the brake pad 13 is disengaged from the brake disc 11. In order to perform a braking operation the actuation unit 5 drives the output shaft 15 in the forward direction F which causes the pivoting lever 17 to pivote around the rotational bearing 25. Due to the fixedly arrangement of a shifting lever 27, the pivoting movement of the pivoting lever 17 is transformed into an axial translational movement of the shifting lever 27 in the forward direction F in order to move the brake pad 13 also in the forward direction F to apply the braking force onto the brake disc 11. Thereby a braking force is applied to the wheel of the vehicle.

The brake assembly 1 is able to perform a dynamic or service braking operation and a parking brake operation. In both operation modes, the brake pad 13 and the brake disc 11 are in frictional engagement with each other order to realize the braking force and thereby prevent the wheel of the vehicle from rotating around the axes of rotation A. In the dynamic braking operation a dynamic actuator 29 of the actuator unit 5 generates an actuation force directed in a force transmission direction $T_F$ in order to drive the output shaft 15 in the forward direction F to engage the brake pad 13 with the brake disc 11. The actuator unit 5 also comprises a parking brake actuator 31 which may be independently activated in the parking brake operation. The parking brake actuator 31 is associated with the dynamic actuator 29 such that in the parking brake operation the frictional engagement of the brake disc 11 and brake pad 13 in maintained. In other words, during a parking brake operation, firstly, the dynamic actuator 29 generates an actuation force in order to bring the brake pad 13 and brake disc 11 into the frictional engagement. Secondly, the parking brake actuator 31 acts on the dynamic actuator 29 such that the frictional engagement of the brake disc 11 and brake pad 13 is maintained without further energy supply. The parking brake actuator is thus realized as a bistable actuator wherein the parking brake actuator 31 comprises two stable positions, namely the parking brake operation position in which the brake pad 13 frictionally engages the brake disc 11, and the passive rest position during driving of the car or during dynamic parking operations.

As may be seen in FIG. 1, the parking brake actuator 31 is coaxially arranged with regard to the dynamic actuator 29. This means that, for example, the force transmission direction $T_F$ for driving the output shaft 15 by the dynamic actuator 29 is coaxially arranged with regard to an actuating force direction $T_A$ of the parking brake actuator 31 for the maintaining the frictional engagement between the brake pad 13 and brake disc 11. The actuation unit 5 may also comprise control electronics 33 physically and/or electronically connected to the electronic system (not shown) of the vehicle in order to receive driving commands for the dynamic actuator 29 and/or the parking brake actuator 31. Depending on the available space, the kind of actuator unit 5 and on the kind of actuating force, namely translational and/or rotational, generated by the actuator unit 5 a transmission unit 35 may be coupled to the output shaft 15 and a driving output shaft 37 of the dynamic actuator 29.

Due to the advantageous arrangement of the dynamic actuator 29 and the parking brake actuator 31 coaxially with regard to each other and/or such that the parking brake actuator 31 is associated with the dynamic actuator 29 in order to maintain the clamping force thereby providing the parking brake force, the brake assembly 1 does not require additional force transmission components. In order to realize the parking brake operation, the parking brake actuator 31 simply uses the force transmission components associated with the dynamic brake operation, namely the dynamic actuator 29, the output shaft 15, the lever arrangement 7 and the braking unit 9, in order to realize the parking brake force. Due to the fact that the parking brake actuator 31 is realized as a bistable system which does not require additional energy supply in the parking brake position and in the passive rest position, the brake assembly is energy efficient and easy to manufacture.

With regard to FIG. 2, an example embodiment of the parking brake actuator 31 is shown as a cross-sectional view. The arrow indicated by the reference sign $T_A$ illustrates the actuating force direction of the parking brake actuator 31. The parking brake actuator 31 comprises a housing 38 with mounting flanges 39, 41 for attaching the parking brake actuator 31 for example to the chassis of the vehicle. The housing 38 is attached to a coupling member 43 which form-fittingly and/or force-fittingly engages the dynamic actuator 29. For example, the coupling member 43 may comprise a blind hole 45 for receiving a rotating driving shaft (not shown) of the dynamic actuator 29 such that a rotational movement of the rotating driving member (not shown) causes a rotation of the coupling member 43. In order to assure the relative rotational movement of the coupling member 43 with regard to the housing 38, a bearing 47 connects the coupling member 43 with the housing 38. The housing 38 and the coupling member 43 are axially secured by a securing device 49 which may comprise a washer 51 and a cover 53 as well as a threaded connection 55, wherein alternative securing devices 49 are possible to realize the axial attachment of the housing 38 and the coupling member 43.

The parking brake actuator 31 further comprises a force transmission member 57 driven in the forward direction F to realize a force transmitting engagement between the dynamic actuator 29 and the parking brake actuator 31 in order to maintain the frictional engagement of the brake disc 11 and the brake pad 13. The force transmission member 57 may be further driven in the reverse direction R to release the force transmitting engagement between the dynamic actuator 29 and the parking brake actuator 31 in order to release the frictional engagement of the brake disc 11 and brake pad 13. The coupling member 43 and the force transmission member 57 are adapted with respect to each other such that a form-fittingly and/or force-fittingly engagement between the coupling member 53 and the force transmission member 57 occurs in the parking brake operation. In the parking brake operation, respectively the engaged state of the coupling member 43 and the force transmission member 57 an angular orientation of the coupling member 43 is locked by the force transmission member 57 in order to prevent the coupling member 43 and therefore the rotating driving output of the dynamic actuator 29 from rotating. Conclusively, the frictional engagement between the brake pad 13 and brake disc 11 is maintained by means of the form-fitting and/or force-fitting engagement between the coupling member 43 and the force transmission member 57.

The force transmission member 57 is arranged such that it may axially move relative to the coupling member 43 and relative to the housing 38 of the parking brake actuator 31. The coupling member 43 is coupled to the rotating driving output member of the dynamic actuator 29, the axis of rotation being indicated with the dash-dotted line S, which generates the forward and reverse driving force of the output shaft 15 such that upon engagement of the force transmission member 57 with the coupling member 43 force flux from the rotating driving output to the force transmission member 57 is redirected from a rotational direction of the rotating driving unit into the forward direction F respectively reverse direction R.

According to another example embodiment of the brake assembly 1, the coupling member 43 is fixedly connected to translational driving output of the dynamic actuator 29 and the force transmission member 57 is associated with the coupling member 43 such that in the parking brake operation axial translational movement of the translational driving output of the dynamic actuator and of the coupling member 43 is prevented, thereby maintaining the braking force by maintaining the frictional engagement between the brake pad 13 and brake disc 11. The coupling member 43 may then be coupled to the output shaft 15 such that upon engagement of the force transmission member 57 with the coupling member 43 force flux from the output shaft 15 to the force transmission member 57 is redirected from the forward direction F respectively reverse direction R into a radial direction perpendicular with regard to the forward and reverse direction.

In the following description, the bistability of the parking brake actuator 31 is described in more detail. Generally, the parking brake actuator 31 stays in the active braking position and in the passive rest position without further energy supply. This means that after activation and a subsequent actuation of the force transmission member 57, no additional energy supply is needed in order to maintain the force transmission member 57 in the engaged state with the coupling member 43, namely the active parking brake position, and in the disengaged state of the force transmission member 57 with respect to the coupling member 43, namely the passive parking brake rest position in which driving of the vehicle is possible and/or dynamic braking operations may be performed by the dynamic actuator 29. The force transmission member 57 is held in the active parking brake position by a spring member 59 associated with the housing 38 and the force transmission member 57. The force transmission member 57 is held in the passive position by a magnet unit 61 comprising a permanent magnet. Alternatively, the spring member 59 maintains the parking brake actuator 31 in the passive position and the magnet unit 61 maintains the parking brake actuator 31 in the active position. The force transmission member 57 may be pretensioned by the spring member 59 into the force transmitting engagement with the coupling member 43, respectively the active position of the parking brake actuator 31. Further, the force transmission member may be pulled into the passive position, respectively the disengaged position of the coupling member 43 and the force transmission member 57, by the magnet unit 61. The spring member 59 and the magnet unit 61 may be designed with respect to each other such that in the active position of the parking brake actuator 31 the spring force generated by the spring member 59 is higher than the magnetic force generated by the magnet unit 61, and in that in the passive position the magnetic force generated by the magnet unit 61 is higher than the spring force generated by the spring member 59. The force transmission member 57 comprises a magnetic element, such as a magnetic coating, or is made completely from metal such that upon axially moving in the forward direction F and the reverse direction R, respectively, the magnetic force between the magnet unit 61 and the magnetic force transmission member 57 varies depending on the distance between the magnet unit 61 and the force transmission member 57.

It is possible, that an electromagnet 63 is provided for actuating the parking brake actuator 31 and for realizing the bistability of the parking brake actuator 31. The direction and/or amount of movement of the force transmission member 57 in the forward direction F and the reverse direction R, respectively, is controlled by the magnetic field which is produced by an electric current through a coil 65 of the electromagnet 63. Therefore, it is also possible that the magnetic force acting between the magnetic force transmission member 57 and the magnet unit 61 not only depends on the distance between them, but maybe also varied by the electromagnet 63, preferably the strength of the electric current through the coil 65 of the electromagnet 63. Therefore, the electromagnet 63 may be electronically connected to the control unit 33 of the brake assembly 1 and/or to the control electronics (not shown) of the vehicle.

The features disclosed in the above description, the figures and the claims may be significant for the realization of the invention in its different embodiments individually as in any combination.

REFERENCE SIGN LIST 1 brake assembly
3 caliber unit
5 actuator unit
7 lever arrangement
9 braking unit
11 brake disc
13 brake pad
15 output shaft
17 pivoting lever
19, 23 end
21 coupling element
25 bearing
27 shifting lever
29 dynamic actuator
31 parking brake actuator
33 control electronics
35 transmission unit
37 output shaft
38 housing
39, 41 flange
43 coupling member
45 blind hole
47 bearing
49 securing device
51 washer
53 cover
55 connection
57 force transmission member
59 spring member
61 magnet unit
63 electro magnet
65 coil
R reverse direction
F forward direction
A rotational axis
S axis of rotation $T_A$ actuating force direction
$T_F$ force transmission direction

The invention claimed is:

1. A brake assembly, comprising:
a brake disc in rotational engagement with a wheel of a vehicle;
a brake pad which frictionally engages said brake disc in a dynamic braking operation and a parking brake operation;
a dynamic actuator comprising an output shaft driven in a forward direction adapted to bring the brake pad and brake disc in said frictional engagement via a lever arrangement in the dynamic braking operation, wherein the lever arrangement is connected to the output shaft and the brake pad; and
a parking brake actuator associated with the dynamic actuator such that, in the parking brake operation, said frictional engagement of the brake disc and brake pad carried out by the dynamic actuator is maintained.

2. The brake assembly according to claim 1, wherein
the dynamic actuator comprises the output shaft driven in a forward direction to bring the brake pad and brake disc in said frictional engagement, and a reverse direction to disengage the brake pad and brake disc, and defines a force transmission direction for driving the output shaft, and
the parking brake actuator has an actuating force direction coaxially arranged with regard to the force transmission direction.

3. The brake assembly according to claim 2, wherein
the parking brake actuator comprises a force transmission member driven in the actuating force direction, to realize a force transmitting engagement between the dynamic actuator and the parking brake actuator in order to maintain the frictional engagement of the brake disc and brake pad, and in the reverse direction to release the force transmitting engagement between the dynamic actuator and the parking brake actuator in order to release the frictional engagement of the brake disc and brake pad.

4. The brake assembly according to claim 3, wherein
the force transmitting engagement between the dynamic actuator and the parking brake actuator is realized via a form fit and/or a force fit by way of the force transmission member.

5. The brake assembly according to claim 3, wherein
the parking brake actuator comprises a coupling member which form fittingly and/or force fittingly engages the dynamic actuator, and
the force transmission member is configured to form fittingly and/or force fittingly engage the coupling member.

6. The brake assembly according to claim 5, wherein
the coupling member is coupled to the output shaft such that upon engagement of the force transmission member force flux from the output shaft to the force transmission member is redirected from the forward and reverse direction into a radial direction perpendicular with regard to the forward and reverse direction.

7. The brake assembly according to claim 6, wherein
the coupling member is coupled to a rotating drive member of the dynamic actuator, which generates the forward and reverse driving force of the output shaft, such that upon engagement of the force transmission member force flux from the rotating drive member to the force transmission member is redirected from a rotational direction of the rotating drive member into the forward and reverse direction.

8. The brake assembly according to claim 5, wherein
the engagement between the coupling member and the force transmission member is realized by an interlocking structure, wherein the coupling member and the force transmission member each comprise at least one protrusion and/or at least one recess,
wherein the at least one recess and/or protrusion of the coupling member and the force transmission member are adapted in shape with regard to each other in order to realize force flux between the coupling member and the force transmission member,
wherein the at least one recess and/or protrusion is axially oriented in the forward and reverse direction or in the radial direction perpendicular with regard to the forward and reverse direction.

9. The brake assembly according to claim 5, wherein
the parking brake actuator is bistable, wherein the parking brake actuator stays in an active parking brake position and a passive rest position without energy supply.

10. The brake assembly according to claim 9, wherein
a spring member maintains the parking brake actuator in one of the active or passive position, and
a magnet unit maintains the parking brake actuator in the other of the active or passive position.

11. The brake assembly according to claim 10, wherein
the magnet unit is a permanent magnet unit.

12. The brake assembly according to claim 10, wherein
the force transmission member is pretensioned by the spring member into the force transmitting engagement with the coupling member for the active position of the parking brake actuator, and the force transmission member is pulled by the magnet unit into the passive position,
in the active position, the spring force generated by the spring member is higher than the magnetic force generated by the magnet unit, and
in the passive position, the magnetic force generated by the magnet unit is higher than the spring force generated by the spring member, or vice versa.

13. The brake assembly according to claim 3, wherein
the parking brake actuator is actuated by an electromagnet, and
a direction and/or amount of movement of the force transmission member is controlled by a magnetic field produced by an electric current through a coil of the electromagnet.

14. The brake assembly according to claim 1, wherein
the dynamic actuator is a pneumatic actuator, an electromechanic actuator or a hydraulic actuator.

15. A method for controlling a brake assembly comprising a brake disc, a brake pad which frictionally engages said brake disc in a dynamic braking operation and in a parking brake operation, and a dynamic actuator comprising an output shaft driven in a forward direction, comprising:
in the parking brake operation, bringing the brake pad into frictional engagement with the brake disc by the dynamic actuator via a lever arrangement connected to the output shaft and the brake pad; and
maintaining said frictional engagement of the brake disc and brake pad.

\* \* \* \* \*